June 9, 1953 P. R. ADAMS 2,641,688
RADIO ECHO PULSE SYSTEM FOR VEHICLES
FOLLOWING A FIXED ROUTE
Filed Feb. 27, 1946 5 Sheets-Sheet 1

INVENTOR.
PAUL R. ADAMS
BY
*R P Morris*
ATTORNEY

Fig. 12.

Patented June 9, 1953

2,641,688

UNITED STATES PATENT OFFICE 2,641,688

RADIO ECHO PULSE SYSTEM FOR VEHICLES FOLLOWING A FIXED ROUTE

Paul R. Adams, Cranford, N. J., assignor to Federal Telephone and Radio Corporation, New York, N. Y., a corporation of Delaware Application February 27, 1946, Serial No. 650,703

21 Claims. (Cl. 246—8)

This invention relates to a system for locating and communicating with vehicles following a fixed route such as cars and trains on a track. More particularly it deals with a wired wireless system for conveying high frequency quasi-radar signals to vehicles along a fixed route, and is related to other inventive features of the combination disclosed in the copending application of Edmond M. Deloraine, filed March 9, 1946, bearing Serial No. 653,268, and entitled "Communication System," assigned to the same assignee as the present invention. The Deloraine application discloses a particular method for intercommunicating between vehicles and fixed stations by means of multiplex pulse modulations coupled to lines arranged along the route of the vehicle.

It is an object of this invention to locate and communicate with vehicles along a fixed route in a novel and effective manner.

It is another object to signal the operator of a vehicle along a fixed route in a novel and effective manner so as to give him more information than he could obtain by other previously employed signaling systems.

Another object is continuously and/or simultaneously to indicate the location of any or all objects along a given fixed route including the location of curves, crossings, bridges, tunnels, switches, other vehicles, and other objects across the route including land slides and the like, as well as to indicate the speed and direction of other vehicles along the route both ahead and behind any given vehicle along the route.

Another object is to indicate and/or control the speed of vehicles along a fixed route either visually and/or automatically according to the location of objects ahead and behind that vehicle as well as according to the speed, weight, length, weather conditions, or the like, which influence the distance within which the vehicle may safely be slowed down and/or stopped. Such objects which affect the speed of vehicles may include curves, tunnels, bridges, and crossings or the like which require speeds below a certain amount for passage thence along with safety.

Another object is to identify different objects along the route as well as their location including different vehicles, curves, tunnels, bridges, different ends of a given vehicle or train, or other information which may be valuable to the operator of a vehicle along a given fixed route.

Another object is to provide means for producing a delay of radar pulses transmitted along the route which may be employed for producing caution and danger signals to vehicles passing along the route and/or automatically control the speed of such vehicles. The term "radar," as used in this specification is meant to imply a radio detecting and ranging apparatus, based on the principle that transmitted radio waves are reflected from objects and, the time delay of a returned echo wave determines the distance to the reflecting object involved. The system envisaged by this invention utilizes a transmission line through which the transmitted and reflected pulses travel.

Still other objects will appear from time to time in the description which follows:

Generally speaking, the system of this invention for locating and communicating with vehicles along the fixed route comprises: (1) a radiating means or transmission line, extending along the fixed route, and (2) a radar transmitter-receiver coupled to the radiating transmission line, and (3) means on the vehicles, at stations and/or at danger or caution sections at points along the route which are inductively or radiation-coupled to the transmission line for affecting the flow of energy in said line sufficiently to be detected at another point along the route.

The communication and radar location system preferably comprises a two-way signaling system, that is, a different frequency carrier wave is provided for the signals traveling in each direction. Additional frequency carrier waves may be provided if three-way radar is employed and/or if a two-way radar system is employed at each end of the fixed route. However, one three-way radar system can give the same information as a two-way radar system at each end terminal, therefore, both types of radar systems are not necessary. The three-way radar system has the advantage over two-way radar systems of only requiring three separate carrier frequency waves instead of four, and therefore requires less equipment.

The quasi-radar location indicating system may comprise a radar pulse generator which transmits pulses of a given frequency in one direction along the route, which pulses may be reflected back to the nearest one of a plurality of repeater stations at spaced intervals (described later) along the route and then converted on to a carrier of another frequency which carries signals passing in the opposite direction, namely the echo pulses. With a single two-way radar system a receiver located at any point along the route will receive a transmitted radar pulse travelling away from the radar transmitter and will also receive from a reflecting object a reflected pulse travelling towards the radar transmitter. Such a receiver, therefore, will receive reflected pulses only from objects located from the receiver in a direction away from the transmitter. The elapsed time at the receiver between the transmitted and the reflected pulses will be proportional to the distance of such objects from the receiver.

A receiver at the location of the radar transmitter will receive reflecting pulses located along the entire route. The received echo pulses may then, together with the transmitted radar pulse, be transmitted on as a whole, as a third carrier frequency, thus establishing a three-way radar system so that receivers along the route tuned to the third carrier frequency may indicate the location of all the objects along the route. Such a system indicates objects both in front and behind any vehicle along the route.

Instead of the three-way radar system a two-way radar system may be provided at each terminal employing four carrier frequency waves, two in each direction, which will also indicate to any vehicle the position of objects both in front and behind it. Two-way radar in each direction is particularly advantageous for vehicles traveling in both directions along the route. If this is the case, either three-way radar or two-way radar systems should be employed. The carrier waves for the radar signals should be modulated on a high frequency radio carrier wave.

The radiating means or transmission line which follows the route should preferably be mounted as closely as possible to the vehicles along the route, the closer the better. This line may comprise a pair of matched wire conductors held an even distance apart by a suitable dielectric medium. These wires may be very close together, but slight errors in spacing are magnified when this is the case. Therefore, it is desirable that they be spaced at at least about one inch apart and should be moulded in a suitable dielectric which will keep them at a constant spacing. In the case of a railway system, these wires may be placed parallel to the rails and preferably as close to the wheels of the cars or other metal objects on the cars as practicable, so that these metal objects may set up a natural impedance in the line to produce a reflecting or echo pulse.

Any change in the design or shape of radiating means such as may occur in a switch or at a crossing where the means may be buried under the route, track or rails, produces echo pulses along the line. However, if proper shielding and joining of the radiating means to a wire cable is carefully made, no echo pulses will be produced. Such shielding and joining is well-known by those skilled in the art of conduction of U. H. F. and micro-waves. On the other hand, production of such a reflection or echo pulse may be desired to indicate the location of that switch, crossing, or the like.

If the cable is along the ground and/or close to one of the rails along a railway track, it may be desired to half shield the cable with a metal coating so that it will only be affected by metal in the rail or other objects adjacent the ground.

Instead of employing the metal parts of the vehicle for producing reflections or echo pulses, devices or metal objects of specific design may be placed on the vehicles to cooperate with the cable causing passive reflections of the radar pulses in the cable.

Another type of radar reflecting device for a vehicle may be of the active type such as a radio transmitter and receiver which may also employ means for identifying the vehicle as well as transmitting other signals over the re-transmitted or echo pulses.

The radar pulses may be transmitted from the vehicle themselves, or may be passed through it from one or more ground stations coupled to the radiating means.

To maintain a relatively constant amplitude signal in the transmission line or cable along the route, repeater stations are placed at suitable intervals, say every mile or so, along the line to amplify the signals transmitted over the cable. To prevent amplification of the carrier frequency waves in the wrong direction, the repeater stations are provided with suitable filters to separate the different directive carrier waves, before they are amplified. These repeaters may also include simple receivers and transmitters for each of the separate carrier wave frequency transmitted over the cable. The power for operating these repeater units may be transmitted directly over one or more of the wires of the cable, or may be supplied from any local source, or from a power line laid especially for that purpose, or from storage batteries in each station, or the like. It is desirable that the power employed by the amplifiers and/or transmitters and receivers in these repeater stations be not much more than about one watt. These stations preferably are automatic and unattended.

Also along the route may be provided signal stations inductively or radiation-coupled to the radiating transmission line or cable which may produce different types of signals for controlling or warning vehicles of obstacles such as curves, tunnels, bridges, or the like along the route. These signal stations may, similarly to repeater stations, be self-contained and unattended and may comprise simple transmitters and receivers with means for identifying or changing the signals received so that they may be identified when they are re-transmitted over the cable.

The location system includes an indicating device, such as a cathode ray tube having a screen upon which the reflected pulses may be indicated along a calibrated scale for visually showing the relative distance between objects along the route. The different reflected pulses may have identifying characteristics such as shape or width or may blink off and on slowly according to different code signals. Furthermore, these reflected pulses may be monitored in a cathode ray device or in suitable gating tubes to indicate the nearness of objects, which indications may be automatically coupled to operation of the vehicle for slowing it down and/or stopping it, if the reflected pulses occur too close to the relative position of that vehicle.

These and other objects and features of the invention will become more apparent upon consideration of the following detailed description of an embodiment of the invention to be read in connection with the accompanying drawings in which.

Figure 3:
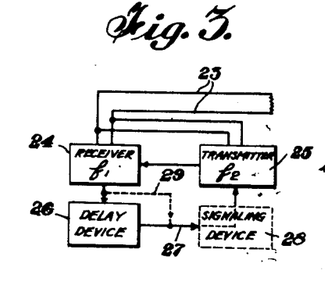
Fig. 3 is a schematic block wiring diagram of a signal station which may be placed along the route shown in Fig. 1.
Figure 4:
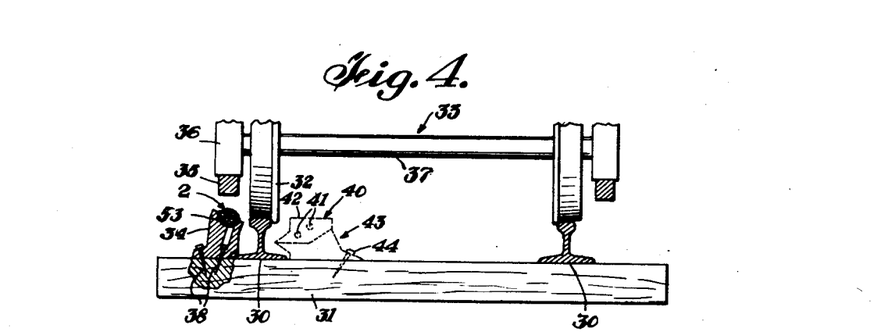
Fig. 4 is a vertical cross-section of a railway track, railway car, and the radiating transmission line of this invention therealong.
Figure 5:
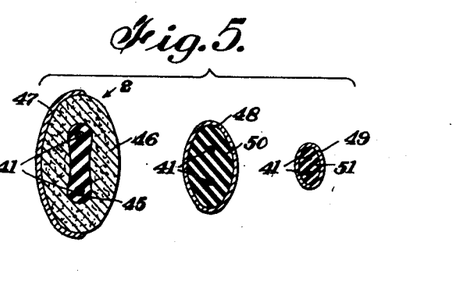
Fig. 5 is a plurality of sections of cables shown in Fig. 4 and having similar impedances.

For purposes of illustration the system of this invention will be described in connection with a railroad communication and location system such as the type schematically shown in Fig. 1. In describing this system the description will be divided into the following chapters:

Chapter I.—The track and radiating means
  (a) Repeater stations (illustrated in Figs. 1 and 2)
  (b) Signal stations for active radar reflections (illustrated in Fig. 3)
  (c) The cable and objects causing natural radar reflections (illustrated in Figs. 4 and 5)

Figure 6:
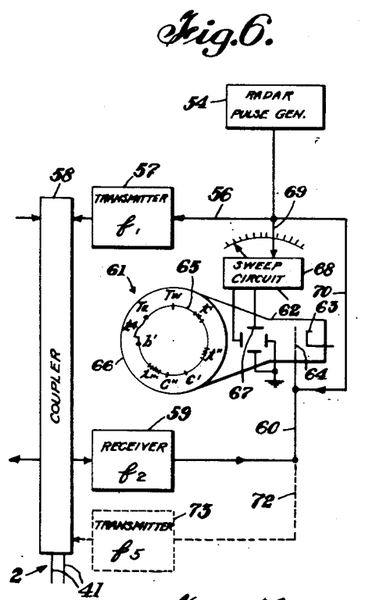
Fig. 6 is a schematic block wiring diagram of a main or the west terminal circuit shown in Fig. 1.

Chapter II.—The west or main terminal circuits (illustrated in Fig. 6)

Figure 7:
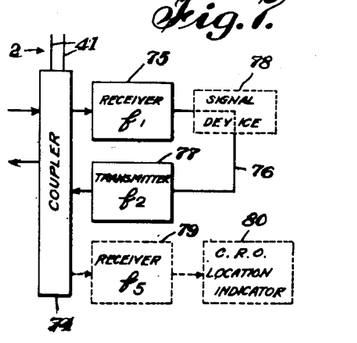
Fig. 7 is a schematic block wiring diagram of the east terminal circuit shown in Fig. 1.

Chapter III.—The east terminal circuits (illustrated in Fig. 7)

Figure 12:
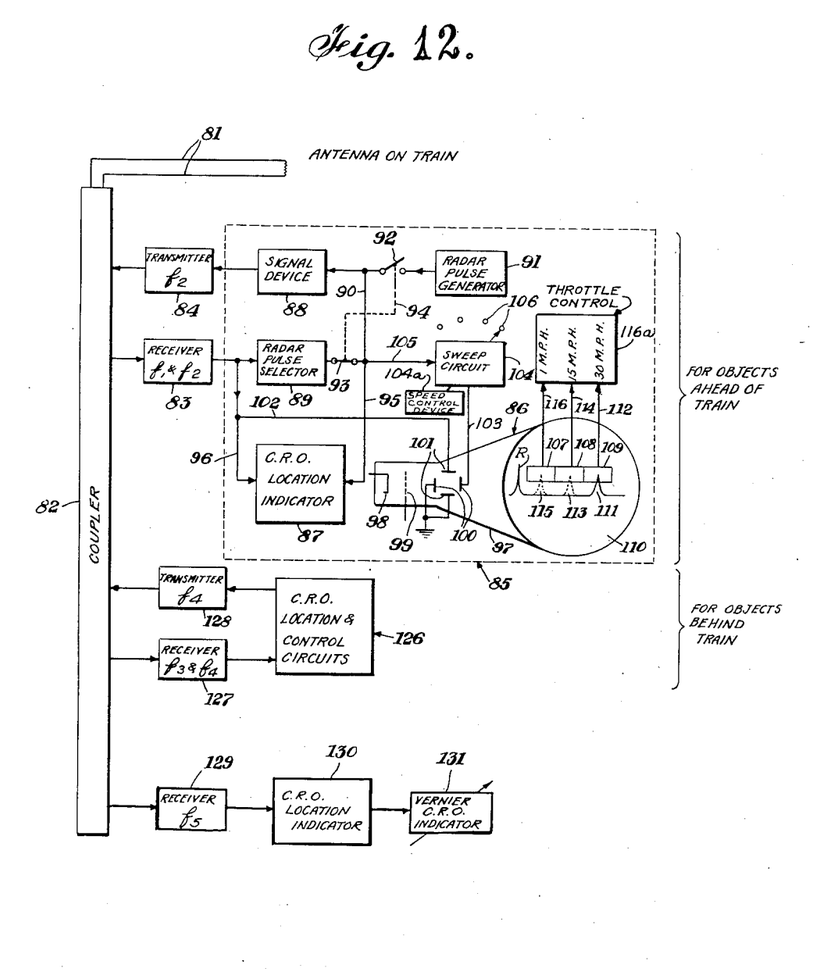
Fig. 12 is a block wiring diagram of a transmitter, receiver circuits and indicator circuits as shown in Fig. 9 but modified so as to provide a three-way radar system.

Chapter IV.—The train circuits (illustrated in Figs. 9 and 10)
  (a) Train identifying circuit (illustrated in Fig. 9)
  (b) Position indicator circuit (illustrated in Fig. 9)
  (c) Speed control devices (illustrated in Figs. 9 and 10)
  (d) Two-way radar (illustrated in Fig. 9)
  (e) Three-way radar (illustrated in Fig. 12)

CHAPTER I

*The track and radiating means*

Figures 1, 2:
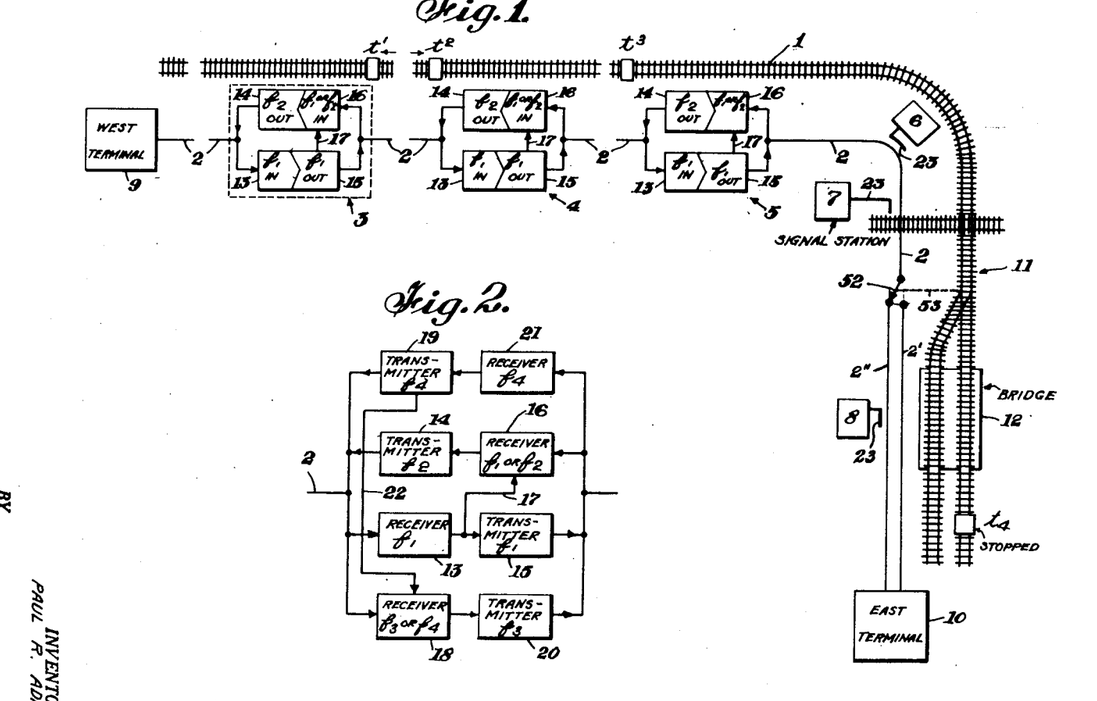
Fig. 1 is a schematic diagram of different portions of a fixed route with a radiating transmission line having repeater stations therealong.
Fig. 2 is a schematic block wiring diagram of a repeater station having two two-way radar transmitters and receivers.

Referring to Fig. 1 there are shown sections of a railroad track 1 having thereon cars or trains $t^1$, $t^2$, $t^3$, $t^4$ stopped or traveling in the directions shown by the arrows. Along the track is provided a radiating transmission line 2 having at spaced intervals therealong repeater stations 3, 4, and 5 and signal stations 6, 7, and 8. At each end of the cable there is provided a terminal; a main or west terminal 9 and an east terminal 10. The track is shown to curve opposite station 6, to have a crossing adjacent signal station 7, to contain a switch 11, and cross a bridge 12 adjacent station 8.

As the trains pass along the track 1 they pick-up signals carried on different frequency carrier waves which for convenience will be indicated as follows: waves of frequencies $f_1$ and $f_2$ for radar and echo pulses transmitted and received, respectively, from and to the west terminal 9; waves of frequencies $f_4$ and $f_3$ for radar and echo pulses which are transmitted and received, respectively, from the east terminal 10; and wave of frequencies $f_5$ which may be used in connection with waves of frequencies $f_1$ and $f_2$ or $f_3$ and $f_4$ for a three-way radar communication system.

I(a). REPEATER STATIONS

Referring specifically to the stations 3, 4, 5 there are provided a filter means 13 for receiving the wave of frequency $f_1$ from the west terminal 9 and separating it from the wave of frequency of $f_2$ amplified and/or transmitted from the circuit 14. The filter means 13 then passes the wave $f_1$ to an amplifying circuit 15 for increasing the strength of the signals in wave $f_1$ and transmitting them on through cable 2 toward the east terminal. If there is a train or other object which reflects the radar pulses on wave $f_1$ located, say between repeater stations 4 and 5 namely train $t^3$, reflected echo pulses of a frequency $f_1$ as well as the pulses from the amplifier circuit 14 in repeater station 5 will pass into the receiver 16. Since the frequency of a radar pulse is not changed by reflection, receiver 16 must have a sufficiently wide receiving band to receive waves of both frequencies $f_1$ and $f_2$ and convert and amplify all the pulses received in circuit 14 onto the carrier wave of frequency $f_2$. Thus, once a reflected or echo pulse has been received in one of the repeater stations 3, 4 or 5 it will from then on be amplified and transmitted over a wave frequency $f_2$ back along the cable 2 to the west terminal 9. If two or more reflecting obstacles are positioned at different points along the route each one will produce a reflection which will be repeated back, as above described. The presence of two or more reflecting obstacles will not result in any continued back and forth reflections or singing, because with each reflection the echo becomes weaker and the sensitivity of the receiver therefore may be designed so as not to be responsive to reflections as weak or weaker than a double echo. This also is the case if two or more objects causing reflections occur between two adjacent repeaters such as trains $t^1$ and $t^2$ between repeaters 3 and 4.

To prevent reflections from the repeaters themselves, the impedances of the circuits 13, 14 are balanced with that of their adjacent connecting line 2, as is the impedance in the circuits 15 and 16 with its adjacent connecting line 2. Singing within the repeaters 3, 4 and 5, due to the amplification in 15 of frequency $f_1$, is prevented by blocking the receivers 16 by means of lines 17 during the time that the amplifiers or transmitters 15 are operating.

If two two-way radar location systems are provided, one from each terminal, a repeater circuit such as that shown in Fig. 2 may be employed. In this figure there is disclosed a repeater comprising filters and amplifiers 13, 14, 15 and 16 with blocking line 17 as shown in Fig. 1, wherein the filters and amplifiers are disclosed as radio transmitters and receivers. Also in Fig. 2 is shown the radio transmitters and receivers 18, 19, 20 and 21 for the radar signal waves of frequencies $f_3$ and $f_4$ to and from the east terminal 10. The outgoing carrier wave $f_3$ from the west terminal 9 passes through the receiver 18 and is then amplified and transmitted in transmitter 20 back onto the cable 2, and similarly the incoming carrier wave of frequency $f_4$ toward the west terminal 9 (and from east terminal 10) is received in receiver 21 and amplified and transmitted in transmitter 19. The receiver 18 is blocked through line 22 (similar to 17) while the transmitter 19 is transmitting, shown in Fig. 2. If a three-way radar system is employed a single receiver and transmitter circuit for the third wave carrier frequency $f_5$ may be substituted for the circuits 19, 20, 21, 18 shown in Fig. 2.

I(b). SIGNAL STATIONS FOR ACTIVE RADAR REFLECTIONS

In order to signal a train of curves, crossings, bridges, switches and the like which occur along the route and do not in themselves produce natural radar reflecting or echo pulses, separate signal stations may be provided which are inductively- or radiation-coupled to the radiating transmission line or cable 2. These stations may receive and transmit and/or re-shape the received pulses to notify the operators of vehicles of their location, or to produce pulses which will automatically control the speed or operation of the vehicle, as will be described later. Three of these signal stations are shown in Fig. 1 at 6, 7 and 8 which produce corresponding pulses $c'$, $c''$ and $b'$ (see Fig. 8).

If desired, a signal station may be placed at each switch (such as switch 11) along the track and may comprise means for transmitting a signal in response to a received signal to indicate whether the switch is opened or closed and/or to slow down the train, to open or close any desired switches ahead or behind the train or other service as desired.

Each signal station may be provided with an antenna 23 (see Fig. 3) which is inductively or radiation-coupled to the cable 2 so that it may receive pulses without causing a natural reflection or echo pulse in the line 2.

The antenna 23 may comprise a pair of lines which are both connected to a receiver 24 and a transmitter 25. Since the receiver 24 is desired to be responsive to radar pulses R (Fig. 8), it is tuned to the frequency $f_1$ and/or $f_4$ to receive only the radar pulses. These received radar pulses may be delayed in delay device 26 an amount sufficiently to correspond to an object any desired distance ahead of the approaching vehicle and then may be passed through line 27 to the transmitter 25, and back onto the line 2 on wave $f_2$. Thus, the operator of the vehicle will see that an object is a certain distance ahead of him and will slow down the vehicle accordingly, or the vehicle may be automatically controlled thereby. Further description of the operation of the vehicle in response to such a delayed pulse will be described later.

There also may be provided in the circuit of stations 6, 7 or 8 a signaling device 28 inserted in the line 27 for re-shaping the delayed pulse or causing it to flicker according to a signal code so as to identify that particular station.

The signal station may only comprise a receiver 24, transmitter 25 and a signaling device 28, namely to identify the position of the station and not to produce a false delay for control of the speed of an approaching vehicle. In this case, the received pulse from the receiver 24 is passed directly through line 29 into the signal device 28 and thence to the transmitter 25.

I(c). THE CABLE AND OBJECTS CAUSING NATURAL RADAR REFLECTIONS

In Fig. 4 there is shown a cross-section of the railway track 1 having a steel rail 30 mounted on a tie 31 on which rolls a steel wheel 32 of a railway car 33. Along the rail 30 is shown a support or wooden molding 34 for supporting the cable 2 as close as possible to metal portions of the car 33, namely the wheel 32 and supports 35 suspended from the bearing 36 on axle 37. The molding 34 may be made of wood and spiked to the tie 31 by means of spikes 38.

At grade crossings, the cable 2 may be re-shaped and positioned along the inside of the tracks 30 as shown in dotted lines at 40. In this embodiment the pair of wires 41 comprising the radiating transmission line may be embedded in a suitable dielectric block 42 made of hard rubber or the like, supported upon a suitable molding 43 spiked by means 44 to the tie 31. The dielectric block 42 may be provided with a flat top which will not be damaged by objects passing across the track 30. The embodiment 40 may be provided the full length of the track, however, it is believed that molding 34 with the cable 2 shown outside the rail 30 would be of more economical design for most places.

If desired, the two or more cables may be provided, one on each side of the track, or one on each side of one rail, wherein one carries signals for trains traveling in one direction and the other carries signals for trains traveling in the opposite direction, or one cable may carry signals for trains on two parallel tracks traveling in the same or opposite directions.

The section of cable 2 shown in Fig. 4 is more clearly shown in Fig. 5 wherein the metal wires 41 comprising the radiating transmission lines are embedded in a suitable strong dielectric 45 which maintains the spacing between wires 41 comparatively constant. It is not necessary that the dielectric 45 be of greater volume than about that shown, since it may be further surrounded by a comparatively less expensive dielectric material 46. This dielectric 46 will protect the cable and give it sufficient size and strength so that it may easily be mounted and laid along the track 30, as well as serve to minimize impedance irregularities in the wires 41 caused by snow, ice and sleet by keeping such undesired elements at least three-quarters of an inch or more away from the wires 41. The dielectric 46 may be made of saw dust and a suitable plastic non-conductive material, molded together to form the cable 2.

The cable 2 may be half-shielded by means of a half metal coating 47 outside the dielectric 46 which is adjacent to the support 34. This metal coating prevents the pulses in the lines 41 from being affected by the metal of the rail 30, or the spikes 38, or other objects which are not along the track or on the rails 30. This half-shield tends to increase the sensitivity of the cable 2 so it will be affected only by the metal of the wheels 32 and/or the suspending portions 35 of the car 33, or other objects adjacent thereto.

In the case of a grade crossing between the two railway tracks, the cable cannot be placed over the crossing rails and therefore it must be buried under the crossing track or otherwise removed from its proximity to the rail 30. It is well-known in high frequency techniques that such a cable may be gradualy changed in shape and size as shown in other views of Fig. 5 and may be provided with a complete metallic shield 48 or 49 surrounding a dielectric medium 50 or 51 without causing reflection or echo pulses. Thus the outside dimensions of the cable may be decreased, the size and spacing of the wires 41 also may be decreased correspondingly as shown in Fig. 5 to prevent such reflections. This change in size of the cable must be gradual and once it is completely shielded as shown at 48 or 49 it may be buried under the ground.

In the case of a switch, such as that shown in 11 in Fig. 1, the cable 2 may be increased in size, similarly, so that the wires 41 at 52 in Fig. 1 may be mechanically constructed and moved to contact either of the adjacent ends of the two cables 2' or 2" when the switch 11 is moved by a suitable connecting means 53. The design of such a switch to prevent reflections is clearly within the knowledge of those skilled in the art of high frequency technique. However, it may be desired that such a switch produces a reflection of a given type and in this case a mere sudden change in the shape or spacing of lines 41 will produce such a reflection, thereby producing an echo pulse indication of the location of the switch.

CHAPTER II

The west or main terminal circuits

A schematic diagram of the radar location and communication circuits in the west or main terminal 9 are shown in Fig. 6.

Figure 8:
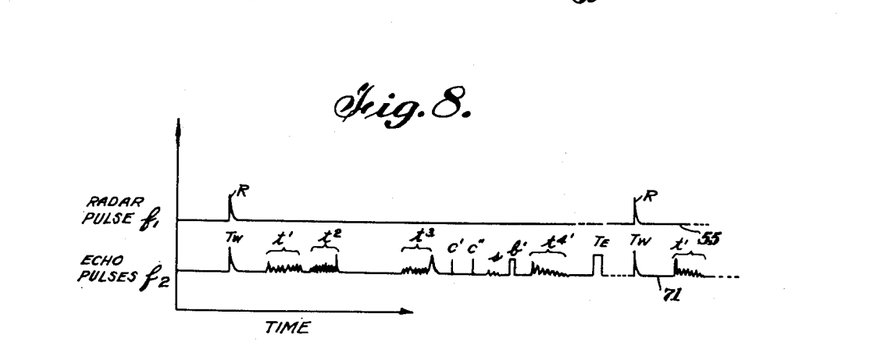
Fig. 8 is a graph of wave forms useful in explaining the operation of the circuits shown in Figs. 3, 6 (and 9)

The radar location system may comprise a radar pulse generator 54 for producing a series of pulses R, as shown on wave 55 in Fig. 8, which pulses should have a frequency of at least about thirty times a second in order that they may produce a continuously visible spot of light on the fluorescent screen of a cathode ray tube or similar indicating devices. These pulses R are then passed through line 56 to a transmitter 57 for modulation on a carrier wave having a frequency $f_1$. The resulting radar wave is then coupled to the line 2 through a suitable coupler means 58.

The reflected or echo pulses which are transmitted back over the line 2 on a carrier wave having a frequency $f_2$ are received through coupler 58 in the receiver 59 and passed through line 60 to a suitable position indicator 61, such as a cathode ray device.

This position indicator 61 may comprise a cathode ray tube 62 having an electron gun 63 for producing a beam of electrons which are cut-off-and-on or varied in intensity by the grid 64 connected to line 60. The beam may be caused to produce a circular trace 65 on a screen 66 by the potential on the plates 67 from the sweep circuit 68 controlled by the radar pulses R from generator 54 through line 69. (The sweep circuit may be variable and if desired an additional or vernier cathode ray tube may be supplied for selecting any portion of the trace 65 and magnifying it on the screen of the vernier tube.) There are shown on the trace 65 spots $T_W$ and $T_E$ which may correspond to the west and east terminals 8 and 9, respectively. The pulse R corresponding to the west terminal may be applied to the grid 64 from the generator 54 over line 70 to produce the spot $T_W$. The spots $t^1$, $t^2$, $t^3$, $t^4$, which appear as a plurality of many short bright pulses corresponding to the trains of corresponding reference characters. The spots $c'$, $c''$ and $b'$ correspond respectively to the signals from the signal station 6, 7 and 8, respectively. The elongated spots corresponding to the trains are due to the many reflections from the wheels of the cars making-up these trains. A clearer illustration of the type of pulses forming the spots along the trace 65 is shown by wave 71 in Fig. 8 in time delayed position relative to the original radar pulses R shown on wave 55.

If a three-way radar system is employed the pulses from the generator 54 in line 70 may also be passed through line 72 together with the received pulses from receiver 59 and modulated on a carrier wave of frequency $f_5$ in the transmitter 73 for re-transmission over the cable 2. As previously mentioned the advantage of a three-way radar enables trains to locate the position of objects both in front as well as behind them and/or may permit trains to travel in both directions along a given route at the same time with comparative safety.

CHAPTER III

The east terminal circuits

The east terminal 10 may comprise communication and radar location circuits similar to the west terminal 9. A schematic diagram of the east terminal circuits is shown in Fig. 7. The radar carrier frequency waves are introduced to and from a common coupler device 74 (similar to 58) which connects the receivers and transmitters of the east terminal to the lines 41 of cable 2.

The radar location system may comprise an $f_1$ carrier wave receiver 75 to receive the radar pulses of wave 55 (shown in Fig. 8), which pulses may be again coupled directly through line 76 to the transmitter 77 onto the carrier frequency wave $f_2$ and passed back onto the cable 2 to produce the bright spot $T_E$ shown on the trace 65 of the location indicator 61 (in Fig. 6) at the west terminal. If desired, however, a signal device 78, similar to that mentioned at 28 in Fig. 3, may be provided in the line 76 for shaping or impressing a characteristic signal on the pulse R before it is re-transmitted from the transmitter 77.

In a two-way radar system an additional radar transmitter and receiver circuit (not shown) similar to that shown in Fig. 6 for the west terminal 9 also should be coupled to the coupler 74. Similarly the west terminal should likewise contain a receiver and transmitter (not shown) for carrier waves $f_3$ and $f_4$, like receiver and transmitter 77 in Fig. 7. Such circuits however are not necessary if a three-way radar system is employed. In this latter case the re-transmitted location indicating pulses on carrier frequency wave $f_5$ are received in a suitable receiver 79 and then passed to a cathode ray location indicator 80, similar to 65 disclosed in Fig. 6. This cathode ray indicator circuit 80 would comprise means for separating the original radar pulses R from the other pulses on the wave and employ the separated radar pulses for controlling the sweep circuit of said cathode ray tube.

Also, if desired, a location indicating circuit (not shown) similar to that described in Fig. 6 may be connected to the coupler 74 for indicating at the east terminal as well as at the west terminal, the position of the trains and objects along the route.

CHAPTER IV

The train circuits

Figure 9:
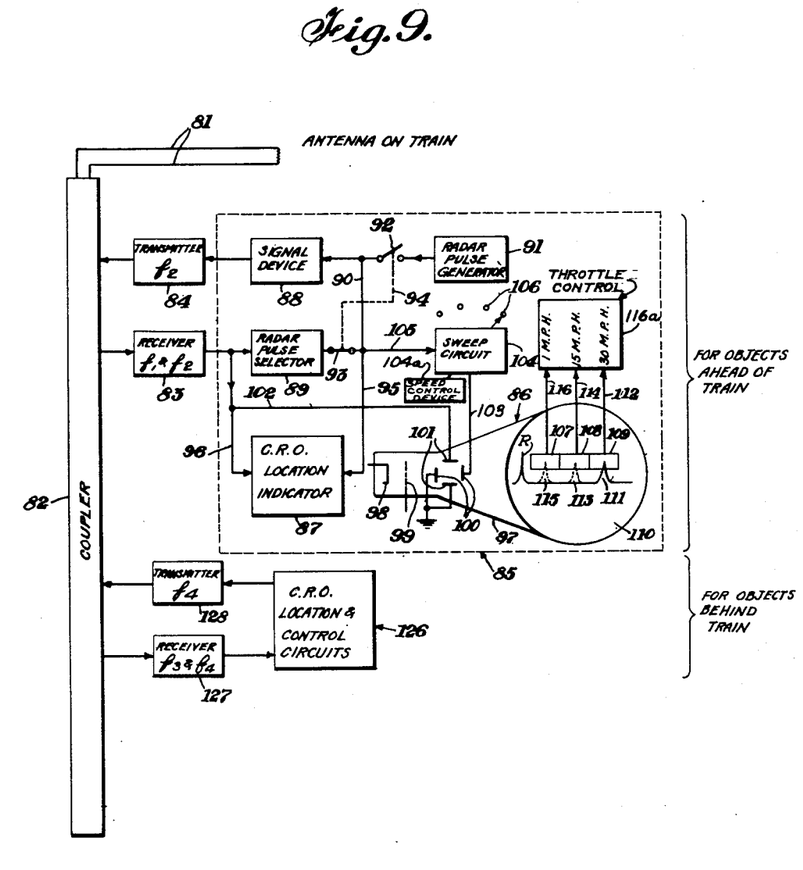
Fig. 9 is a block wiring diagram of a active transmitter and receiver circuit for a vehicle or train on the route or track shown in Fig. 1.

Any one or more of the cars traveling over the track 1 may be equipped with a radar receiver and transmitter system similar to that shown in the block diagram of the Fig. 9. It is desirable, however, that each train have at least one such system and in case of freight or other long trains it may be desirable to have such a system at each end of the train.

The transmitter and receiver circuits on the train may be provided with an antenna 81 which should be suspended from the car as close to the cable 2 as practically possible, say within at least about one foot thereof. This antenna 81 may be any suitable type of radiating means and may be jointly coupled to the transmitters and receivers for the different carrier frequency waves to a suitable coupler 82, similar to couplers 58 and 74 above mentioned.

Similarly as shown in the repeater stations, the location-indicating system is provided with a receiver 83 for receiving pulses on both carrier frequency waves $f_1$ and $f_2$ and a transmitter 84 for transmitting only the echo pulse from the train on the carrier frequency wave $f_2$. The receiver 83 is constructed to receive both frequency carrier waves $f_1$ and $f_2$ so that it may receive echo pulses from objects along the track which are between it and the next repeater station ahead of the train as well as echo pulses from objects beyond said next repeaters. This receiver and transmitter are connected to the location indicator and control circuits 85 which may comprise a speed control device 86, a cathode ray location indicator 87, and a signaling or train identifying circuit 88.

IV(a). TRAIN IDENTIFYING CIRCUIT

The received echo and radar pulses may be first passed into a radar pulse selector 89 which separates the radar pulses from the echo pulses either by amplitude selection or by selection of the first pulse of the train of pulses corresponding to pulse Tw on wave 71 (and R on wave 55) in Fig. 8. The thus selected radar pulses may then be passed through line 90 to a signal device 88 wherein these pulses may be re-shaped and/or flickered according to a given code signal corresponding to the particular train. The resulting coded radar pulses are then passed to the transmitter 84 for modulation on the carrier frequency wave $f_2$ and transmission back along the cable 2 in the opposite direction of the received radar pulse on wave $f_1$.

If desired, the radar pulses R may be initiated on the train from the radar pulse generator 91 and connected through switch 92 to the signal devise 88, or may be directly connected to the transmitter 84 by a line not shown. In such a system it is not necessary to provide a radar pulse selector 89 since synchronization of the indicating and control devices 86 and 87 may be had through a direct connection to the generator 91. Thus, the operation of switch 92 may open switch 93 through suitable connecting means 94 for disconnecting selector 89.

IV(b). POSITION INDICATOR CIRCUIT

The cathode ray location indicator device 87 may be identical with the indicator 61 previously described and disclosed in connection with Fig. 6. This indicator may be controlled by (1) the selected radar pulses through line 95 for operating the sweep circuit of the indicator, and (2) all the echo pulses received from receiver 83 which may be connected through line 96 either to the grid of a cathode ray tube or a pair of deflection plates as shown in the cathode ray tube control device 86 described below.

IV(c). SPEED CONTROL DEVICES

Figure 10:
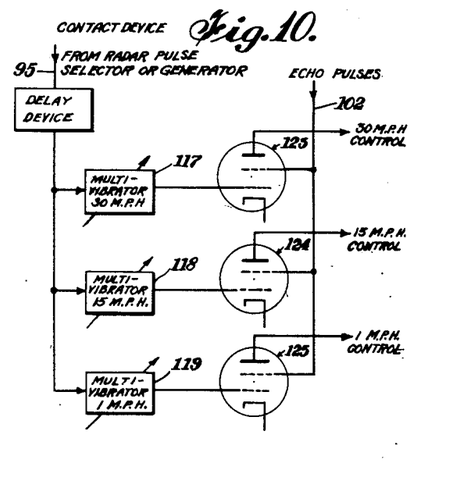
Fig. 10 is a schematic wiring diagram of a modification of the control circuit shown in Fig. 9.

The speed control device 86 may be of several forms, two of which are disclosed: one a cathode ray speed indicator device 86, shown in Fig. 9 and the other an electronic gate circuit speed control indicating device of the type shown in Fig. 10.

The device 86 shown in Fig. 9 comprises a cathode ray tube 97 with an electron gun 98, grid 99, a pair of horizontal deflection plates 100, and a pair of vertical deflecting plates 101. The vertical deflecting plates 101 are directly connected over line 102 to the receiver 83 for producing pulses along the sweep line corresponding to the echo pulses received by the train. The horizontal deflecting plates 101 are connected through line 103 to a variable control sweep circuit 104 triggered by the selected radar pulses or the generated radar pulses from circuits 89 or 91, respectively, through line 105. The variable control sweep circuit 104 adjusts the spread of the beam and corresponding distance scanned in the tube, depending upon the rate of speed of the train, the weight of the train, the type of the train, the length of the train, and/or the local weather conditions. This adjustment may be made automatically, such as by connecting the control for the circuit 104 to a speed governer 104a on the train, and/or separate contacts 106 may be provided corresponding to different weather conditions and/or different types of trains; or both. The reason for such adjustment will be described later.

The target end of the tube 97 is provided with a series of separate target plates 107, 108, 109 out of alignment with the initial radar pulse R, as shown on the screen 110 of the tube 97. On the screen 110 the radar pulse R is followed a given distance by an echo pulse 111 which contacts the target plate 109. This target may be connected to a circuit (not shown) through line 112 for indicating that an object is a certain distance away and that a certain speed, say 30 miles per hour, should be set as the maximum speed for the safety of the train. As the train approaches closer to the position of the object, the pulse 111 will move into the position 113 and contact the plate 108 which is connected to a circuit (not shown) through line 114 which will indicate that the maximum speed of the train should be, say, 15 miles per hour. Similarly, as the train approaches still closer to the object the pulse will appear in the position 115 and contact the plate 107 which is connected through a circuit (not shown) through line 116 for indicating danger, stop, or a maximum speed of, say, about one mile per hour. If desired the lines 112, 114, 116 may be directly connected to a suitable control device 116a to control the throttle of the train to slow it down automatically instead of, or as well as, visually indicating the position of the object producing the pulses 111, 113, 115.

The adjustment for controlling the spread of the sweep circuit 104 thus will determine the effective distance at which the first reflected pulse will first contact the target plate 109. For example, if the train is a heavy freight train and the weather is icy it would take a much longer time to stop the train than if the train were light and the weather were dry. Accordingly, for the safest operation and control of such a train, a spread of the beam across the screen 110 corresponding to a distance, say, of several miles, should be employed by selecting a contact 106 which will produce such a spread.

Figure 11:
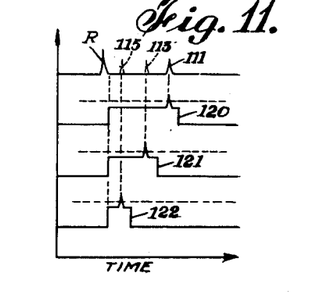
Fig. 11 is a graph of wave forms useful in describing the operation of the circuit of Fig. 10.

Referring now to the gate control device shown in Fig. 10, which may be employed instead of the cathode ray device 86, the line 95 carrying the selected or generated radar pulses may be slightly delayed (about the amount of their duration) and then coupled to a series of multivibrators 117, 118 and 119 (corresponding to the targets 107, 108, 109) for producing rectangular pulses of different durations 120, 121 and 122, respectively, shown in Fig. 11. The received pulse wave containing all the echo pulses 111, 113, 115 (see the first wave in Fig. 11) are passed through line 102 onto one of the grids of each of the gate tubes 123, 124, 125. The alignment of the slightly delayed pulse R with the leading edges of the pulses 120, 121, 122 graphically shows how these pulses are produced in the multivibrator circuits 117, 118, 119, respectively. The output of these multivibrator circuits are respectively coupled to another grid in each of the gate tubes 123, 124, 125, so that when one of the reflected pulses 111, 113, or 115 superimposes upon the corresponding pulse 120, 121, or 122, the tube will become conductive and current will pass from the plate thereof to operate a circuit (not shown) for indicating and/or controlling the maximum safe speed of the train. For example, the plate of tube 123 is coupled to a control device for indicating the maximum speed of 30 miles per hour; the plate of tube 124 is connected to a control device for indicating maximum speed of 15 miles per hour; and the plate of tube 125 is connected to a control device for indicating danger, stop, or a speed of one mile per hour.

The width or duration of the pulses 120, 121, 122 produced in the multivibrators 117, 118, 119 may be varied by varying the time constant circuits in these multivibrators in accordance with the type, weight, speed of the train, weather conditions, etc., similarly as the spread of the sweep circuit 104 was adjusted in the control device shown in Fig. 9.

IV(d). TWO-WAY RADAR

Referring again to the circuit in Fig. 9, if a radar system is provided also at the other or east terminal for the convenience of trains traveling in the opposite direction or for indicating the position of objects behind a train, a circuit similar to 85 (above described) shown in block 126 may be coupled to a receiver 127 for receiving pulses on the carrier waves of frequencies $f_3$ and $f_4$, and may be coupled to a transmitter 128 for transmitting pulses on the carrier frequency wave $f_4$. This transmitter 128 and receiver 127 is likewise connected to coupler 82.

IV(e). THREE-WAY RADAR

Referring now to the circuit of Fig. 12 which is a modification of a circuit shown in Fig. 9, a three-way radar system is shown, similar elements to this shown in Fig. 9 and performing the same function as those shown in Fig. 9 being utilized with the addition that a separate receiver 129 for receiving carrier wave $f_5$ may be coupled to the coupler 82, and from it may be operated a cathode ray type location indicator 130, similar to 61 shown in Fig. 6 or similar to that provided in circuit 87 above mentioned. As previously referred to, this location indicator 130 may be coupled to a variable vernier location indicator 131 for magnifying the pulses from objects along any selected portion of the route disclosed on the screen of the indicator of circuit 130.

While the above is a description of the principles of this invention in connection with specific apparatus and particular modifications thereof, it is to be clearly understood that this description is made only by way of example and not as a limitation on the scope of this invention as defined in the accompanying claims.

I claim:

1. A safety device for vehicles following a fixed route, comprising a conductor for pulse signals of the radar type said conductor extending along said route, a radio-frequency pulse transmitter coupled to said conductor, a signal warning station located remotely from said transmitter along said route and also coupled to said conductor, an object located along said route but further remote from said transmitter than is said station, means at said station to receive pulses transmitted over said conductor from said transmitter, means at said station controlled by the received pulses to re-transmit radio frequency pulses back to said conductor, and means at said station to introduce a time delay between the received and re-transmitted pulses which delay is correlated with the distance between said station and said object.

2. A safety device for vehicles following a fixed route comprising a radiating transmission line extending along said route, a radio frequency pulse transmitter coupled to said line, means including a signal station along said line and coupled thereto, for affecting the flow of energy therealong, said station including receiving means and radio frequency re-transmitting means both coupled to said line, delay means coupled between said receiving means and said re-transmitting means, said delay means adapted to delay pulses received by said receiving means from said line a predetermined time representing the location of an object along said line a known distance from the location of said station, and warning means on one of said vehicles coupled to said line to warn the operator thereof of the proximity of said vehicle to said object, said last named means under control of the pulses re-transmitted by said re-transmitting means.

3. The device as claimed in claim 2, wherein said warning means includes a pulse echo receiver.

4. The device as claimed in claim 2 wherein said warning means comprises a pulse echo receiver and means coupled to said receiving means for indicating the maximum safe speed of said vehicle depending upon the proximity of said vehicle to said object.

5. The device as claimed in claim 2 wherein said pulse transmitter is on at least one of said vehicles.

6. The device as claimed in claim 2 wherein said warning means includes a cathode ray device coupled to said receiving means and having a visual screen for indicating the pulses reflected from said signal station, said reflected pulses spaced on said screen a distaance proportional to the distance of said vehicle from said station.

7. The safety device of claim 2 wherein said station includes means to modify the said re-transmitted delayed pulses with a characteristic code before they are re-transmitted from said station.

8. The safety device of claim 2 wherein said station includes a code flicker device coupled to said re-transmitting means, which device flickers the delayed re-transmitted pulses before they are re-transmitted from said station.

9. The device as claimed in claim 2, wherein said warning means includes a device coupled to the driving mechanism of said vehicle to control the speed thereof, said device responsive to the receipt of said re-transmitted pulses.

10. A safety device for vehicles following a fixed route comprising an electrical conductor extending along said route, a radio frequency pulse transmitter coupled to said conductor, a signal station coupled to said conductor; said station including receiving means adapted to receive pulses from said transmitter, radio frequency re-transmitting means coupled to said conductor, and delay means coupled between said receiving means and said re-transmitting means, said delay means adapted to delay pulses received by said receiving means from said conductor a given amount of time correlated with the location of an object along said route a given distance from the location of said station, and means on one of said vehicles coupled to said conductor to warn the operator thereof of the proximity of said vehicle to said object, said means comprising a cathode ray device having an electron beam, a target and a sweep circuit for deflecting said beam past said target.

11. The safety device of claim 10 wherein said means to warn the operator includes means for varying the time of sweep of said beam past said target.

12. The safety device of claim 10 wherein said means to warn the operator includes a device coupled to the driving mechanism of said vehicle and responsive to the speed thereof and means for automatically varying the rate of sweep of said beam corresponding to the speed of said vehicle, said device and said last-named means coupled together.

13. A safety device for vehicles following a fixed route comprising an electrical conductor extending along said route, a radio frequency pulse transmitter coupled to said conductor, a plurality of signal stations coupled to said conductor at various points along said route, each of said stations comprising receiving means coupled to said conductor and delay means coupled to said receiving means, said delay means adapted to delay pulses received by said receiving means from said transmitter a given amount to simulate a pulse-reflecting object along said route a given distance from the location of each of said stations, and means on one of said vehicles to warn the operator thereof of the proximity of said vehicle to said simulated objects, said last named means comprising a plurality of gate circuits coupled to said conductor, different ones of which are operated by the delayed pulses from different ones of said delay means.

14. The safety device as claimed in claim 13, wherein said vehicle includes a driving mechanism and said means to warn the operator of said vehicle comprises a speed governor coupled between said driving mechanism and said sweep circuit, said governor adapted to variably adjust said circuit to correlate same in accordance with distance corresponding to the location of said station and the speed and weight of said vehicle.

15. A safety device for vehicles following a fixed route comprising a radiating transmission line extending along said route, a radio frequency pulse transmitter coupled to said line, means along said route inductively coupled to said line for affecting a flow of energy in said line including a radio frequency transmitter, a receiver and delay means coupled between said transmitter and said receiver, for producing a false delay in the received pulse before re-transmitting the resulting delayed pulse as an echo pulse, said delay correlated with the location of an object along said route and pulse echo receiver means on at least one of said vehicles for receiving said false delayed echo pulse.

16. The device as claimed in claim 15 further comprising a control device coupled to the driving mechanism of said vehicle to control the speed thereof, said device coupled to said pulse echo receiver means and responsive to the receipt of said delayed pulses, whereby the speed of said vehicle is controlled.

17. The safety device as claimed in claim 16, wherein said control device includes means for slowing down the speed of said vehicle in response to echo pulses from objects at a given distance and means for stopping said vehicle in response to echo pulses from objects at a lesser distance.

18. A signaling system for vehicles following a fixed route; comprising a radiating transmission line extending along said route, a pulse reflecting obstacle located along said route at an inductive distance from said line; a transmitter-receiver on at least one of said vehicles for supplying signal pulses of a radiation frequency to said line and for receiving therefrom reflected pulses derived from reflection of the signal pulses by said obstacle, and vehicle location manifesting means controlled by said transmitter-receiver for selective operation according to the time relation between the signal pulses and the reflected pulses.

19. A safety device for vehicles following a fixed route; comprising a radiating transmission line extending along said route, a radio transmitter coupled to said line for applying signal pulses of a radiation frequency thereto, object-indicating means along said route inductively coupled to said line for producing thereon echo pulses in response to said signal pulses, a radio receiver on any of said vehicles to receive the signal pulses and the echo pulses, and means controlled by the receiver according to the time relation of the signal pulses and the echo pulses for warning the operator of the vehicle provided with the receiver of the proximity of his vehicle to objects along said route, said warning means including means for automatically indicating the maximum safe speed for his vehicle depending upon its proximity to the nearest object ahead of it along the route.

20. A safety device for vehicles following a fixed route; comprising a radiating transmission line extending along said route, a radio pulse transmitter coupled to said line to apply signal pulses thereto, object indicating means along said route responsive to said signal pulses on the line for producing echo pulses on the line, a radio receiver on one of said vehicles for receiving the signal pulses and the echo pulses from said line, and means controlled by the receiver according to the signal and echo pulses and including a cathode ray device having a target, a sweep circuit for the electron beam in the cathode ray device, and means for varying the rate of sweep of said beam past said target in accordance with the speed of said one of the vehicles.

21. A safety device for vehicles following a fixed route; comprising a radiating transmission line extending along said route, a radio transmitter for applying signal pulses to said line, object indicating means along said route responsive to the signal pulses for producing echo pulses on the line, a radio receiver on one of said vehicles for receiving the signal and echo pulses from said line, and means controlled by said receiver according to the time relation between the signal pulses and the echo pulses for automatically varying the speed of said one of the vehicles.

PAUL R. ADAMS.

References Cited in the file of this patent

UNITED STATES PATENTS

| Number | Name | Date |
|---|---|---|
| 2,460,597 | Rodgers | Feb. 1, 1949 |
| 2,510,066 | Busignies | June 6, 1950 |